April 14, 1925.    F. TANDEL    1,533,955
FRICTION CLUTCH
Filed Aug. 20, 1923
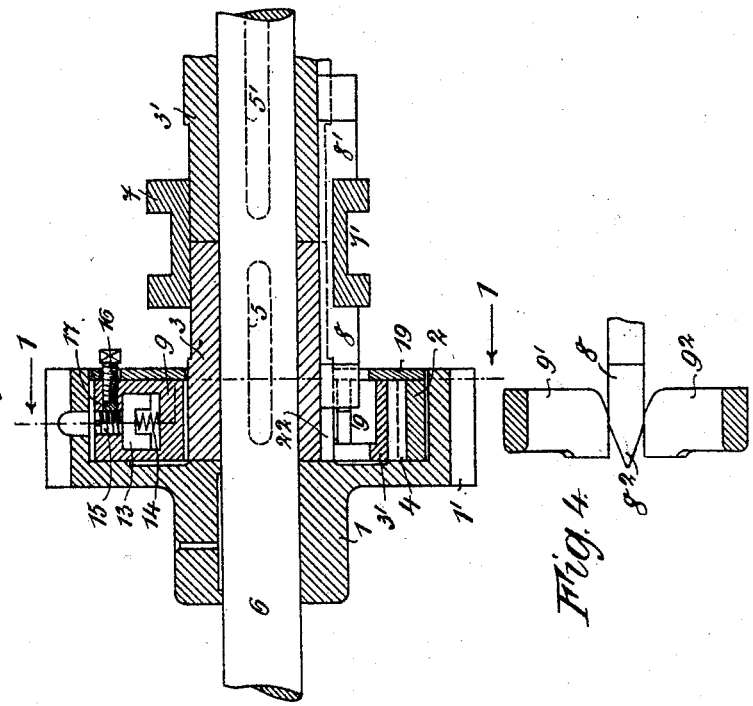
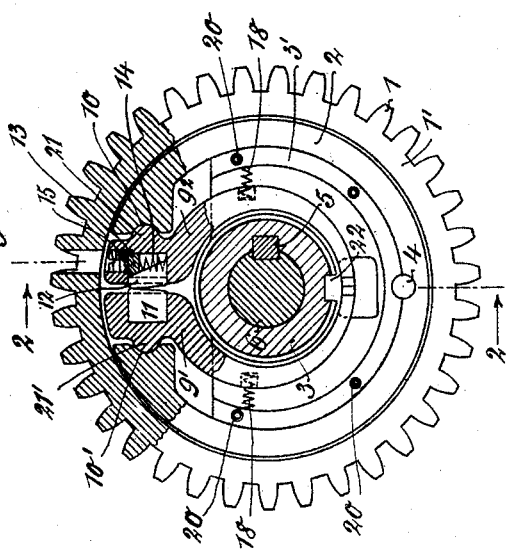
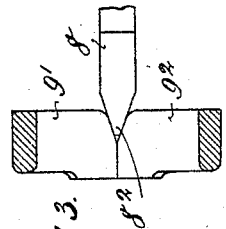
Witnesses:
Emil Kayser
Robert Schaper
Inventor:
Fritz Tandel.
by Edward C. Sarnett
Attorney.

Patented Apr. 14, 1925.

1,533,955

UNITED STATES PATENT OFFICE.

FRITZ TANDEL, OF CHEMNITZ, GERMANY, ASSIGNOR TO THE FIRM OF C. G. HAUBOLD, A. G., OF CHEMNITZ, SAXONY, GERMANY, A CORPORATION OF GERMANY.

FRICTION CLUTCH.

Application filed August 20, 1923. Serial No. 658,368.

*To all whom it may concern:*

Be it known that I, FRITZ TANDEL, a citizen of Germany, residing at Chemnitz, in the State of Saxony, Germany, have invented certain new and useful Improvements in Friction Clutches; and I do hereby declare the following to be a full, clear, and exact description of the invention, such as will enable others skilled in the art to which it appertains to make and use the same.

My invention relates to improvements in friction clutches, and more particularly in friction clutches of the type in which a pair of rockers are adapted to be spread apart for forcing an open friction ring connected with one of the clutch members into frictional or coupling engagement with the other one of the clutch members. The object of the improvements it to provide a clutch of this type which is simple in construction and reliable in operation. With this object in view my invention consists in the matters to be described hereinafter and particularly pointed out in the appended claims. In the accompanying drawing, Fig. 1, is a cross-section of the clutch taken on the line 1—1 of Fig. 2, Fig. 2, is a longitudinal section taken on the line 2—2 of Fig. 1, and Figs. 3 and 4, are detail views showing the member for spreading the rockers in different positions.

In the example shown in the drawing the clutch consists of a clutch member 1 rotatably mounted on a shaft 6 and a clutch member 3 secured to the shaft by means of a key 5 or the like. As shown the clutch member 1 is in the form of a spur gear. The member 3 is formed with a segmental flange 3' disposed concentrically of the rim or flange 1' of the spur gear 1, and between the said flanges there is an open coupling ring 2 locked to the flange 3' by means of a bolt 4. The opposing end faces of the ring 2 are formed with cylindrical notches 10 and 10' providing fulcrums for rockers $9^1$, $9^2$ engaging in the said notches with semi-cylindrical projections 21 and 21'. The opposing end faces of the rockers are provided with sockets providing seats for shoes 11 and 12 of tempered steel or the like, and the inner end faces of said shoes are in contact with each other. The rockers are in the form of semi-circular arms disposed within the annular space provided between the hub and the segmental flange 3' of the clutch member 3, and the free ends of the arms bear on each other, as is shown in Figs 1 and 3. As appears more particularly from Fig. 1 the shoe 11 is exactly fitted within its socket and it can not be adjusted therein. But the shoe 12 is shiftable within its socket towards the shoe 11 for compensating the wear of the parts. As shown the shoe 12 is formed with a beveled rear face bearing on an adjusting wedge 13. The wedge 13 is acted upon by a spring 14 tending to force the same outwardly and by a screw 15 screwing in a bore of the rocker and adapted to force the wedge inwardly against the action of the spring 14. After adjusting the parts the screw 15 is fixed in position by means of a screw 16, a lining 17 of soft metal being preferably interposed between the screws 15 and 16 to prevent injury to the threads of the screw 15.

In a longitudinal groove 22 of the hub of the clutch member 3 a bar 8 is slidable in axial direction, which bar is formed with a wedge shaped end $8^2$ normally engaging between the ends of the arms of the rockers $9^1$ and $9^2$ as is shown in Fig. 3 and adapted to spread the same apart in the manner shown in Fig. 4. The bar 8 is adapted to be shifted by means of a sleeve 7 mounted on the hub of the member 3 and adapted to be operated by means of a lever or the like engaging in a throat 7' of the sleeve.

The contacting faces of the shoes 11 and 12 are beveled relatively to each other and curved so that when spreading the arms of the rockers $9^1$ and $9^2$ apart by means of the bar 8 the free ends of the ring 2 are spread apart and the ring is forced into frictional engagement with the flange of the member 1, so that the members 1 and 3 are coupled with each other.

In order that in case of high numbers of revolution the rockers $9^1$ and $9^2$ be not spread apart by centrifugal action and thus cause accidental closing of the clutch springs 18 are provided which tend to force the arms of the rockers inwardly.

The inner parts of the clutch are covered by a disk 19 secured to the flange 3' by means of screws 20.

I claim:

1. In a clutch, two rotatable members, a friction member adapted for frictional engagement with one of said members and rotatable with the other of said members, a pair of rockers adapted to force said friction member into frictional engagement, one of said rockers having a recess near one end thereof, a shoe mounted in said recess to move in the plane of said rockers bearing on the other rocker and formed with an inclined face opposite its bearing face, a member in said recess having an inclined face engaging the inclined face of said shoe, and means for adjusting said member.

2. In a clutch, two rotatable members, a friction member adapted for frictional engagement with one of said members and rotatable with the other member, a pair of rockers adapted to force said friction member into frictional engagement, one of said rockers having a recess near one end thereof, a shoe mounted in said recess to move in the plane of said rockers bearing on the other rocker and formed with an inclined face opposite its bearing face, a member in said recess having an inclined face engaging the inclined face of said shoe, a screw adapted to move said member in one direction and a spring engaging said member and tending to move it in the opposite direction.

In testimony whereof I hereunto affix my signature in the presence of two witnesses.

FRITZ TANDEL.

Witnesses:
M. CROEBER,
I. VON LESCHAY.